United States Patent [19]

Watson

[11] 4,131,249
[45] Dec. 26, 1978

[54] EXTERNAL PORTABLE PROPELLER ROTATOR

[76] Inventor: Ronald S. Watson, P.O. Box 9599, San Diego, Calif. 92109

[21] Appl. No.: 863,984

[22] Filed: Dec. 23, 1977

[51] Int. Cl.² .............................................. B64F 1/34
[52] U.S. Cl. .............................. 244/53 A; 123/185 R
[58] Field of Search .................. 244/1 R, 53 R, 53 A; 123/179 AS, 185 R, 185 D, 185 BA; 46/76 R, 78; 185/41

[56] References Cited

FOREIGN PATENT DOCUMENTS

| | | | |
|---|---|---|---|
| 572876 | 6/1924 | France | 244/53 A |
| 571299 | 2/1925 | France | 244/53 A |
| 208538 | 5/1924 | United Kingdom | 244/53 A |

*Primary Examiner*—Barry L. Kelmachter
*Attorney, Agent, or Firm*—Jack N. McCarthy

[57] ABSTRACT

A device for starting an aircraft engine which is capable of being started by rotating a propeller connected to the crankshaft of the engine. The device comprises an anchor for fixedly positioning on the landing surface below the propeller; this anchor can be held in place by a portion of the aircraft itself; in one case, the nose wheel and in another case, a separate extension arrangement. A holding device is provided for holding the propeller and crankshaft of the engine against rotation in a proper starting position while a rotative device is provided for placing a biasing force on the propeller for rotating it. When desired, the holding device is remotely released and the propeller is pulled through the compression stroke by the rotative device and rotated in a manner to start the engine by the rotation of the crankshaft. Each of the holding device and rotative device has a propeller tip cap for connection to the propeller, while the other ends are fixed to the anchor.

12 Claims, 10 Drawing Figures

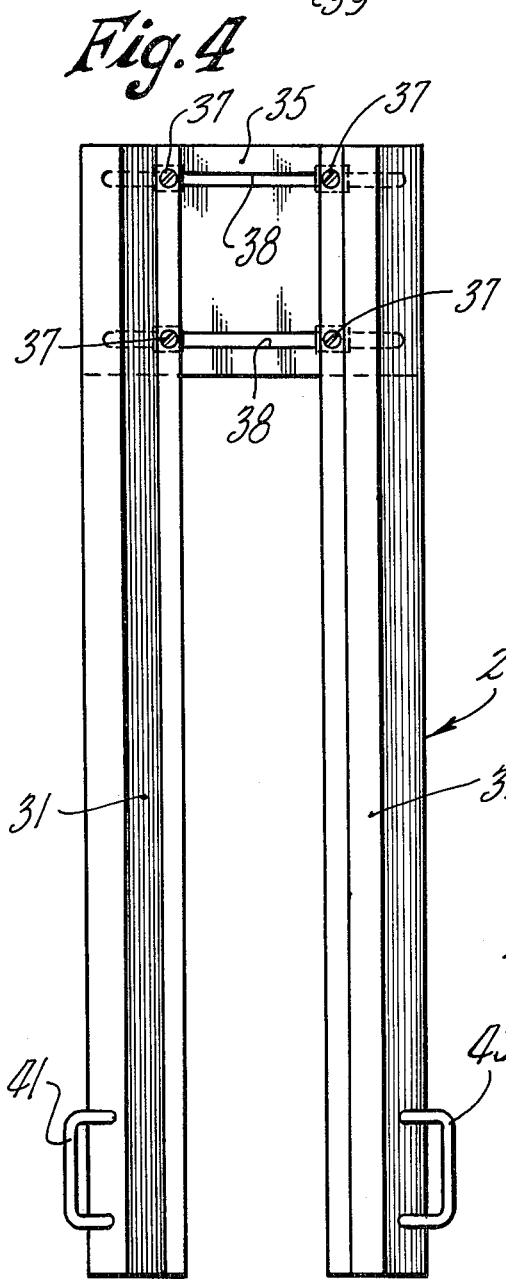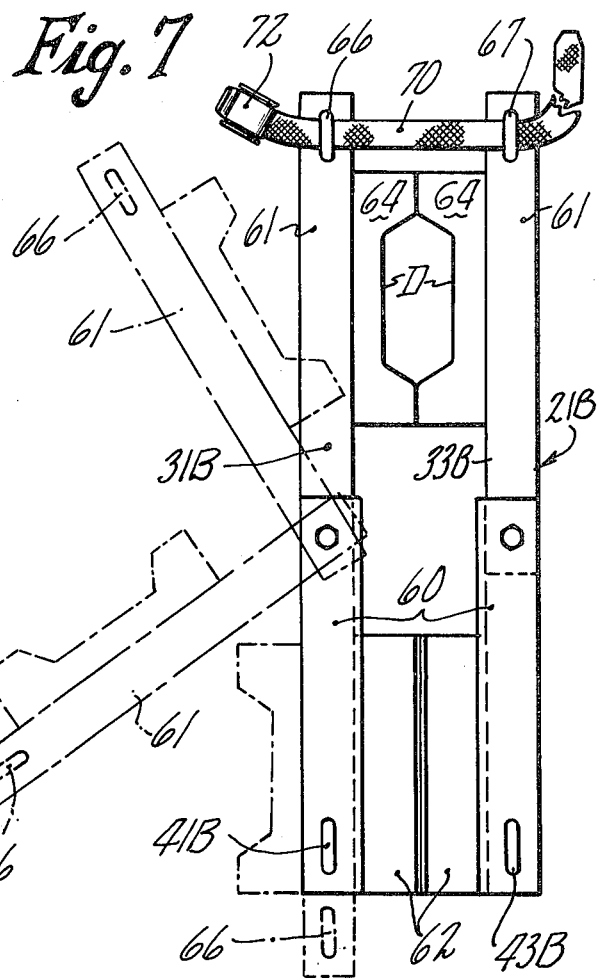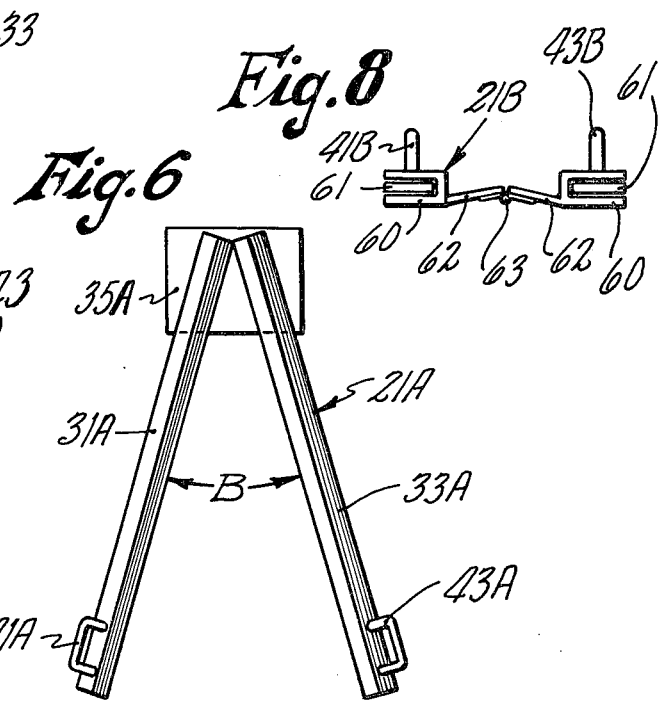

EXTERNAL PORTABLE PROPELLER ROTATOR

BACKGROUND OF THE INVENTION

This invention relates to rotating the propeller of an aircraft for starting it. Previously, propellers of such aircraft have had blades thereof pulled by individuals by hand directly or by an extension device connected to the propeller. Devices for starting internal combustion engines, some of them aircraft engines, are shown in the following patents: U.S. Pat. Nos. 2,266,098; 2,293,322; 2,547,010; and 3,718,129.

SUMMARY OF THE INVENTION

A primary object of the present invention is to provide a lightweight external portable device for rotating an aircraft propeller for starting an engine.

In accordance with the present invention, a holding device is provided for an external propeller for holding it against rotation in a proper starting position while a rotating force is placed on the propeller. The holding device is released when desired and the propeller is rotated by the rotating force to attempt to start the engine.

In accordance with a further aspect of the invention, an anchor means is fixed below the aircraft while one tip of a blade of the propeller is connected to the anchor means for holding it against rotation while the tip of another blade of the propeller is connected to an anchor means by a resilient construction which can have its force increased to that necessary to turn the propeller for starting it; the holding device has a quick-release mechanism for releasing the propeller tip to which it is connected and permitting the propeller to be rotated. Said quick-release mechanism can be remotely operated, for example, from the cockpit of the plane.

In accordance with another aspect of the invention wherein a propeller tip cap is used to fit over a tip of a blade of a propeller to hold the propeller against rotation in one instance and to place a rotating force on the propeller in another instance, the propeller tip cap is preferably made of plastic or a heavy webbing material such as used for parachute harnesses. The propeller tip cap used for holding the propeller against rotation can be a solid cap which is released in its entirety or opened to release the propeller.

In accordance with a further aspect of the invention, an anchor means is disclosed which is adjustable to accommodate different widths of tires and made adjustable to produce a smaller package for storing.

BRIEF DESCRIPTION OF THE DRAWINGS

FIG. 4 is a top view of an anchor means;

FIG. 5 is an end view of the anchor means shown in FIG. 4;

FIG. 6 is a top view of a first modification of an anchor means;

FIG. 7 is a top view of a second modification of an anchor means;

FIG. 8 is an end view of the anchor means shown in FIG. 7;

DESCRIPTION OF THE PREFERRED EMBODIMENT

Figure 1:
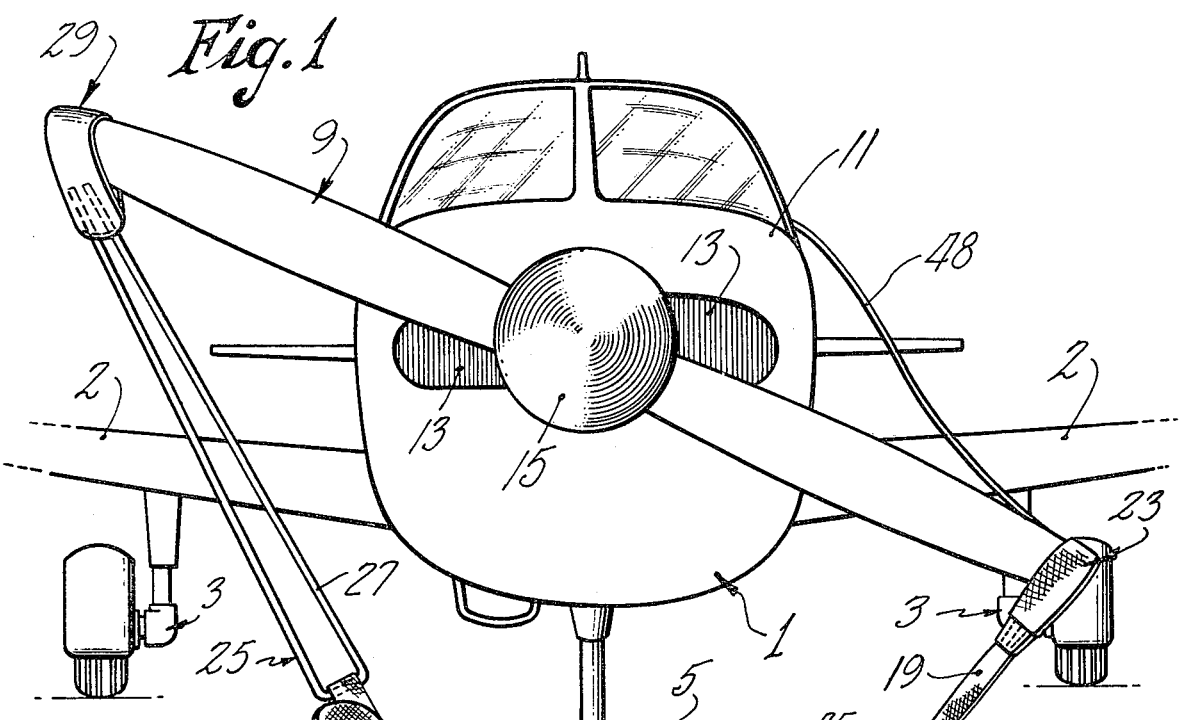
FIG. 1 is a front view of a propeller driven aircraft having a nose wheel showing the invention positioned thereon for rotating the propeller by the pilot from within the aircraft.

As shown in FIG. 1, an aircraft 1 is positioned on the ground in a parked position having a wing 2 extending on each side thereof with main landing gear 3 under each wing with their wheels on a landing surface. A nose landing gear 5 extends downwardly and has its wheel 7 also positioned on the landing surface. A propeller 9 is mounted on the aircraft for propulsion thereof on a crankshaft extending from an engine located in a nacelle 11. Air inlets 13 are shown at the front of the aircraft. A faired hub 15 covers the center mounting of the propeller on the engine crankshaft. Without electrical or other engine starting means, it is sometimes necessary that an engine be started by rotating the propeller which will rotate the crankshaft of the engine for starting the engine in a manner well known in the engine art.

To rotate the propeller 9 so that the crankshaft of the engine can be rotated to provide an engine self-start, a holding device 17 is provided for holding the propeller 9 and crankshaft of the engine against rotation in a proper starting position, while a rotative device 25 is provided for placing a force on the propeller for rotating it. When desired, the holding device 17 is released and the propeller is pulled through the compression stroke and rotated in a manner to start the engine by the rotation of the crankshaft by the rotative device 25.

The holding device 17 comprises a strap means 19 having a propeller tip cap 23 on one end for fitting over a propeller tip and holding it against rotation. The remainder of the strap means 19 is formed to be attached at a desired fixed length to an anchor means 21, to be hereinafter described. The rotative device 25 for placing a force on the propeller includes a resilient means 27 connected to an adjustable length means 28. The adjustable length means 28 is connected to the anchor means 21 and the resilient means 27 is connected to a propeller tip cap 29 for fitting over a propeller tip.

The anchor means 21 is a device which must be fixed with relation to the aircraft 1 so that the appropriate ends of the holding device 17 and rotative device 25 can be fixedly positioned for the function of holding, and then rotating, the propeller. The anchor means 21 shown in FIGS. 1, 4 and 5 comprises two elongated rigid arms 31 and 33, triangular in cross section, which are adjustably connected at their rearward end by a plate 35. The arms 31 and 33 are adjustably fixed to the plate 35 to receive different widths of tires on wheels 7. Two bolts 37 are provided for fixing the arms 31 and 33 to the plate 35. Two holes are placed in one end of each of the arms 31 and 33 in a like manner. A groove 38 extends transversely in plate 35 for each pair of aligned holes in arms 31 and 33. The bolts 37 extend through the holes and cooperating grooves 38 to permit adjustability and final positioning of the arms 31 and 33. Nuts 39 are located below the plate 35 for the bolts 37. Rigid metal loops 41 and 43 extend upwardly from the free ends of the arms 31 and 33, respectively, for fixedly holding one end of the rotative device 25 and the holding device 17.

As shown in FIG. 1, the tip cap 23 fits over the tip of one blade of the propeller 9 while the strap means 19 passes through metal loop 43 and bends back to an adjustable gripping means 45, such as a seat buckle, which permits the length of the holding device 17 to be varied and then fixed. The adjustable gripping means 45 can be a simple buckle device.

Figure 3:
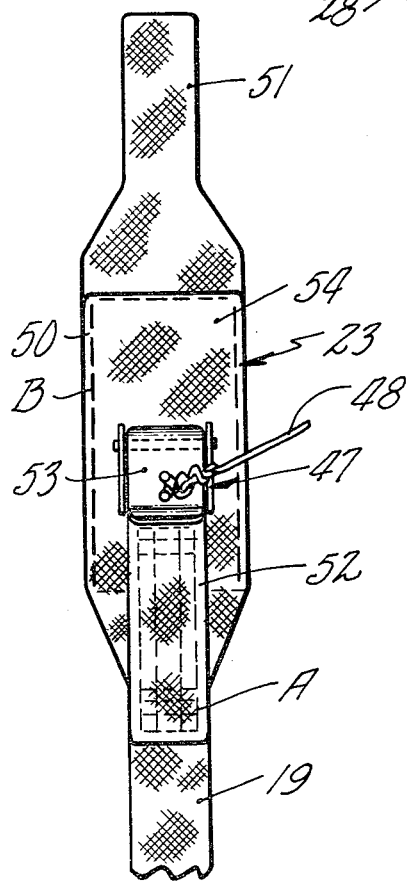
FIG. 3 is a back view of the propeller tip cap shown in FIG. 2 in its open position.
Figure 2:
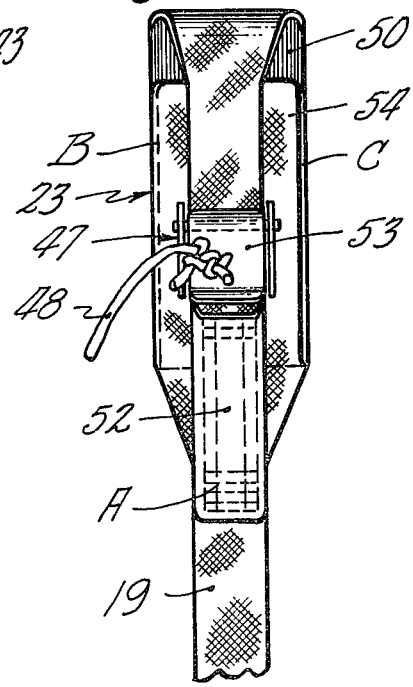
FIG. 2 is a back view of a modification of a propeller tip cap which has an openable top in its closed position.
Figure 9:
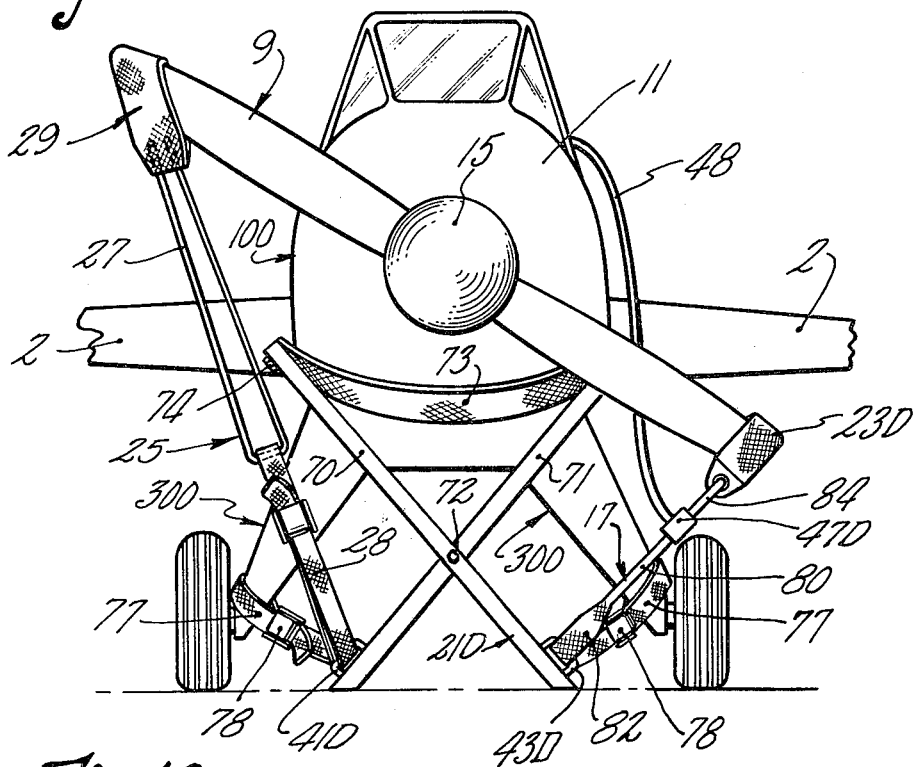
FIG. 9 is a front view of a propeller driven aircraft having a tall wheel or skid showing the invention positioned thereon and using a third modification of an anchor means for rotating the propeller by the pilot from within the aircraft.
Figure 10:
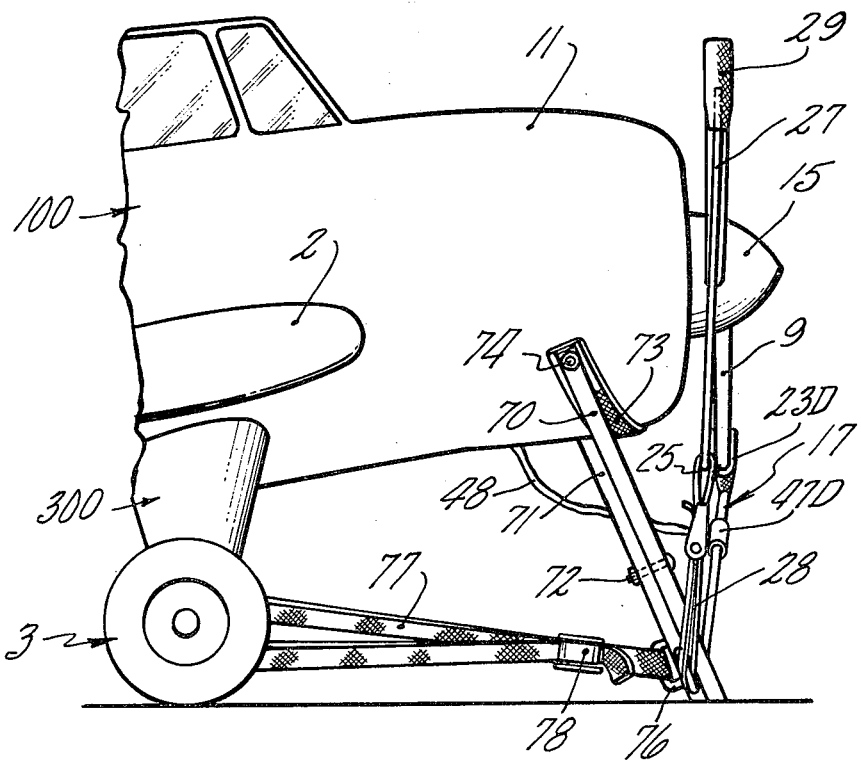
FIG. 10 is a side view of FIG. 9.

The tip cap 23 and quick-release device 47 can be constructed in several ways, with one way being shown in FIGS. 1, 2 and 3, and another way being shown in FIGS. 9 and 10. In FIGS. 1, 2 and 3, the tip cap 23 is shown as a wide heavy fabric member 50 having a narrowed free end 51, while the other end is fixedly connected to the strap means 19. This can be done by sewing or by being made integral therewith. The quick-release device 47 is fixed to the end of a short strap 52 which is in turn fixed to the strap 19 at A. The quick-release device 47 shown is the type wherein a top pivotal plate 53 can be raised, while the free end of a strap 51 can be inserted into the quick-release device. When the plate 53 is pushed flat against the strap passing therethrough, the strap is locked in position against a flat fixed bottom plate. Usually serrations on the under side of the plate 53 bite into the strap. When the plate 53 is lifted, the strap 51 is free to be pulled from the quick-release device 47. The plate 53 has a cord 48 connected thereto which permits the plate 53 to be pulled open a safe distance from the aircraft propeller, such as from the cockpit of the aircraft. When the plate 53 is moved to an open position, the tip of the propeller 9 in the tip cap 23 pulls the strap 51 from the quick-release device 47 by its rotation by the rotative device 25. The tip cap 23 has an extra flap 54 connected to the strap 19 which extends upwardly to prevent the aircraft propeller from contacting the inner surface of the quick-release device 47. The tip cap 23 can be sewed at B so that a pocket is formed, opening at C, to receive the tip of the propeller. In some cases, the flap can remain free and the tip cap can just be placed over the tip of the propeller, permitting the tip to extend therethrough.

The tip cap 29 can be constructed in several ways, with one way being shown in FIGS. 1 and 9. This tip cap 29 is formed to fit over the tip of a propeller and extend downwardly therefrom to provide a connection with the resilient means 27 of the rotative device 25. While the resilient means 27 can be connected to the tip cap 29 by any known means desired, FIGS. 1 and 9 show a bungee cord connected to the adjustable length means 28 with free ends being sewed to a tip cap 29 formed of a heavy fabric. This tip cap can also be formed permitting the tip of the propeller to extend therethrough and also be formed as a heavy net or of plastic.

FIG. 6 shows a modification of the anchor means 21A. This modification has the two arms 31A and 33A fixed to a plate 35A at an angle B which will permit the anchor means 21A to be fit around any size tire as it presses against a landing surface and have it provide the support necessary for the upward force on the loops 41A and 43A. This modification of the anchor means 21A can have two arms 31A and 33A pivotally mounted to the plate 35A with a means being provided to pull the free ends of the arms 31A and 33A together, squeezing the arms against a tire. Any means can be used, such as a strap and buckle, as shown in FIG. 7.

FIGS. 7 and 8 show another modification of the anchor means 21B wherein the anchor means can be pivoted along its length and pivoted along its width to produce a small package for storing. This modification has the two arms 31B and 33B pivoted near the center thereof so that one end can be pivoted towards the other. The forward part of arms 31B and 33B are formed as members 60, having a U-shaped cross section, while the rearward part of the arms 31B and 33B are formed as members 61 having a rectangular cross section which will fit in its cooperating U-shaped member 60. FIG. 7 shows member 61 in phantom to indicate how it is pivoted to a storing position. The U-shaped members 60 have plates 62 extending inwardly with a pivotal connection at their mating edges. The plates 62 are angled upwardly slightly to make room for the hinge 63 connecting them, permitting the anchor means 21B to set on a flat surface. The rearward part of the arms 31B and 33B are formed having plate members 64 extending inwardly. The mating edges of plates 64 are cut out at D so that they can be placed around the bottom of a tire. The plates 64 are approximately the same thickness as the plates 62. Rigid metal loops 66 and 67 extend upwardly from the rear ends of the members 61 to provide for holding the members 61 against the tire of an aircraft, with the plates 64 extending thereunder. It is noted that the loops 66 and 67 fold in front of the loops 41B and 43B. A strap 70 with a buckle 72 can be used to hold the rigid metal loops 66 and 67 together when the anchoring means 21B is in position. It is to be understood that any positioning and holding means desired can be used.

As shown in FIGS. 9 and 10, an aircraft 100 is positioned on the ground in a parked position having a wing 2 extending on each side thereof with main landing gear 300 under the aircraft with wheels on a landing surface. The main landing gear 300 includes a strut extending downwardly on each side. A tail wheel or skid is used at the rear end of the aircraft and it also is positioned on the landing surface. A propeller 9 is mounted on the aircraft for propulsion thereof in a manner similar to the aircraft in FIG. 1 having a nose landing gear 5. Since in FIGS. 9 and 10 an anchor means 21 cannot be placed under the wheel of a nose landing gear, a modified anchor means 21D is necessary. As stated hereinbefore, the anchor means 21D is a device which must be fixed with relation to the aircraft 100 so that the appropriate ends of the holding device 17 and rotative device 25 can be fixedly positioned for the function of holding, and then rotating, the propeller. The anchor means 21D shown in FIGS. 9 and 10 comprises two elongated rigid legs 70 and 71 pivotally mounted to each other intermediate the ends by a bolt 72 passing therethrough, forming a scissors-type arrangement. A heavy fabric belt 73 extends between the tops of the legs 70 and 71 and is fixed thereto by bolts 74. The legs 70 and 71 are fixed so that when the belt 73 is placed against the lower part of the nacelle 11 of the aircraft 100, the bottoms of the legs engage the landing surface approximately under the propeller 9. To fit several types of aircraft, the legs can be made adjustable in length. Each leg 70 and 71 has a loop 76 attached to the rear portion thereof and at the bottom for fixedly holding the belt 73 against the nacelle 11 and the bottoms of the legs 70 and 71 in a fixed position. A belt 77 passes around the bottom of each strut of the landing gear 300 and through its cooperating loop 76. The belt 77 can have a conventional buckle 78 so that the bottom of the legs 70, 71 can be tightly placed in position. The bottom of the legs 70 and 71 have rigid metal loops 41D and 43D extending upwardly for the same purpose as the metal loops 41 and 43 of the anchor means 21 in the other modifications. The rotative device 25 shown in FIG. 9 is identical to the rotative device 25 shown in FIG. 1. However, the holding device 17 is different. This holding device comprises a rod 80 which is hooked to the loop 43D by a hooked end 82. The tip cap 23D is formed as a tip cap 29 with a heavy cord 84 fixed thereto at one end with its free end projecting into a quick-release device 47D; the quick-release device 47D being fixed to the free end of the rod 80. This quick-release device 47D can be any known quick-release device desired which is capable of holding a heavy cord 84 and then quick-releasing it when actuated by pulling a cord 48. The quick-release device 47D in FIG. 9 is shown schematically. The cord 48 can be located for actuating the quick-release device 47 in a remote location and could be positioned in the cockpit of the aircraft, as mentioned hereinbefore concerning FIG. 1. The free end of the cord 48 can have a hook means for engaging a loop means in the cockpit. While various specific elements have been shown, it is to be understood that the use of equivalent elements is contemplated.

I claim:

1. A device for starting an aircraft engine which is capable of being started by rotating a propeller connected thereto comprising a first connecting means for holding said propeller in a desired fixed position, a second connecting means for applying a force on said propeller for rotating said propeller, said first connecting means including a first tip cap means at one end adapted to be placed on one blade tip of said propeller, said second connecting means including a second tip cap means at one end adapted to be placed on another blade tip of said propeller, an anchor means for positioning below said aircraft propeller, said first connecting means being adapted to be connected at another end to said anchor means, said second connecting means being adapted to be connected at another end to said anchor means, said first connecting means including a quick-release device for releasing said first tip cap means whereby said second connecting means can pull said propeller in a direction to rotate said propeller about its axis on said aircraft engine for starting the engine.

2. A device as set forth in claim 1 wherein said first connecting means includes a strap means having an adjustable length.

3. A device as set forth in claim 1 wherein said second connecting means includes a resilient section which can be placed in tension for applying a force on said propeller.

4. A device as set forth in claim 3 including means connected to said resilient section and said anchor means for varying the tension placed in the resilient section.

5. A device as set forth in claim 3 wherein said resilient section comprises a bungee cord.

6. A device as set forth in claim 1 wherein said quick-release device can be operated by means remotely located from the propeller.

7. A device as set forth in claim 6 wherein said quick-release device is operated by means extending to the cockpit of an aircraft.

8. A device as set forth in claim 1 wherein said anchor means is adapted to be fixedly positioned by a portion of an aircraft.

9. A device as set forth in claim 8 wherein said anchor means includes plate means for being fixedly positioned under a nose wheel of said aircraft, the forward part of said anchor means having holding means for fixedly holding ends of said first connecting means and said second connecting means.

10. A device as set forth in claim 1 wherein said first tip cap means is openable, and said quick-release device opens said first tip cap means.

11. A device as set forth in claim 1 wherein the quick-release device separates said first connecting means between its ends.

12. A device as claimed in claim 1 wherein said anchor means includes a member having one end positioned against the bottom portion of an aircraft with the other end being positioned below said aircraft propeller, said other end having first holding means for fixedly holding ends of said first connecting means and said second connecting means, said other end having second holding means for fixing said member in place.

* * * * *